United States Patent
Tsujii

(10) Patent No.: US 10,041,455 B2
(45) Date of Patent: Aug. 7, 2018

(54) HUMIDITY SENSOR DEVICE ARRANGED IN A CHOKE PORTION OF AN INTERNAL COMBUSTION ENGINE INTAKE AIR PASSAGE

(71) Applicant: DENSO CORPORATION, Kariya, Aichi-pref. (JP)

(72) Inventor: Hidehito Tsujii, Obu (JP)

(73) Assignee: DENSO CORPORATION, Kariya (JP)

( * ) Notice: Subject to any disclaimer, the term of this patent is extended or adjusted under 35 U.S.C. 154(b) by 343 days.

(21) Appl. No.: 14/734,416

(22) Filed: Jun. 9, 2015

(65) Prior Publication Data
US 2015/0354512 A1    Dec. 10, 2015

(30) Foreign Application Priority Data
Jun. 10, 2014  (JP) .................................. 2014-119834

(51) Int. Cl.
| | |
|---|---|
| *F02M 35/10* | (2006.01) |
| *G01N 27/02* | (2006.01) |
| *F02D 41/14* | (2006.01) |
| *G01F 1/684* | (2006.01) |
| *G01F 1/692* | (2006.01) |
| *G01F 5/00* | (2006.01) |

(52) U.S. Cl.
CPC ..... *F02M 35/10393* (2013.01); *F02D 41/144* (2013.01); *F02D 41/1462* (2013.01); *F02M 35/10386* (2013.01); *G01F 1/6842* (2013.01); *G01F 1/692* (2013.01); *G01F 5/00* (2013.01); *F02D 2200/0418* (2013.01)

(58) Field of Classification Search
CPC ................................. F02M 35/10393
USPC ....................................... 73/114.32
See application file for complete search history.

(56) References Cited

U.S. PATENT DOCUMENTS

| | | | |
|---|---|---|---|
| 5,672,822 A * | 9/1997 | Sawada ................. | F02D 41/187 73/114.34 |
| 2008/0148842 A1 | 6/2008 | Oda | |
| 2010/0031737 A1 | 2/2010 | Saito et al. | |
| 2011/0107832 A1 | 5/2011 | Sakuma | |
| 2012/0079879 A1 | 4/2012 | Saito et al. | |
| 2014/0290359 A1 | 10/2014 | Saito et al. | |
| 2016/0146651 A1 * | 5/2016 | Isoya ..................... | G01F 1/684 73/114.34 |

FOREIGN PATENT DOCUMENTS

JP    2-132363    5/1990

* cited by examiner

*Primary Examiner* — Walter L Lindsay, Jr.
*Assistant Examiner* — Philip Marcus T Fadul
(74) *Attorney, Agent, or Firm* — Nixon & Vanderhye PC

(57) ABSTRACT

A sensor device is disposed in an intake passage through which intake air flows to an internal combustion engine. The sensor device includes a humidity sensor that generates a signal according to a humidity of the intake air flowing through the intake passage. A choke portion is defined in the intake passage to decrease a cross-sectional area of the intake passage. The humidity sensor is arranged on the choke portion.

16 Claims, 7 Drawing Sheets

HUMIDITY SENSOR DEVICE ARRANGED IN A CHOKE PORTION OF AN INTERNAL COMBUSTION ENGINE INTAKE AIR PASSAGE

CROSS REFERENCE TO RELATED APPLICATION

This application is based on Japanese Patent Application No. 2014-119834 filed on Jun. 10, 2014, the disclosure of which is incorporated herein by reference in its entirety.

TECHNICAL FIELD

The present disclosure relates to a sensor device.

BACKGROUND

JP 2008-157742 A (US 2008/0148842 A1) describes a humidity sensor disposed in an intake passage through which intake air is drawn to an internal combustion engine. The humidity sensor outputs a signal according to a humidity of the intake air flowing through the intake passage.

However, if the flow velocity of the intake air flowing through the intake passage is slow, intake air retains near the humidity sensor. In this case, the responsivity of the humidity sensor is lowered.

It is known that an internal combustion engine has an optimal ignition timing according to the humidity of intake air. In recent years, it is required to further raise the fuel mileage and knocking controllability by immediately responding to change in the humidity of intake air so as to control the ignition timing.

In an exhaust gas recirculation (EGR) equipment having a supercharger, failure is caused by condensed water adhering to a compressor. In recent years, condensed water is restricted from adhering to a compressor in the EGR equipment by immediately responding to change in the humidity of intake air so as to control the flow rate of EGR gas, such that the fuel mileage is increased while NOx generation is restricted.

In addition, in urea selective catalystic reduction (SCR) system or NOx storing and reduction catalystic system for a diesel engine, the amount of NOx can be presumed from the humidity of intake air, such that a NOx sensor upstream of the SCR catalyst or NOx storing and reduction catalyst can be replaced with the humidity sensor.

SUMMARY

It is an object of the present disclosure to provide a sensor device having high responsivity while a flow velocity of intake air flowing through an intake passage is low.

According to an aspect of the present disclosure, a sensor device has a humidity sensor arranged in an intake passage through which intake air flows to an internal combustion engine. The humidity sensor outputs a signal according to a humidity of intake air flowing through the intake passage. The intake passage has a choke portion which decreases cross-section area of the intake passage, and the humidity sensor is arranged on the choke portion.

In case where the flow velocity of intake air flowing through the intake passage is low, the flow velocity of intake air can be raised by the choke portion, such that intake air is restricted from retaining near the humidity sensor. For this reason, when the flow velocity of intake air flowing through the intake passage is slow, the responsivity of the humidity sensor can be improved.

According to an aspect of the present disclosure, a sensor device has a humidity sensor arranged in an intake passage through which intake air flows to an internal combustion engine. The humidity sensor outputs a signal according to a humidity of intake air flowing through the intake passage. The sensor device further has a housing with a sub-passage communicated to the intake passage. A part of intake air flowing through the intake passage is drawn into the sub-passage that is branched from the intake passage, and the humidity sensor is arranged in the sub-passage. The sub-passage has the choke portion which decreases cross-section area of the sub-passage, and the humidity sensor is arranged on the choke portion.

In case where the flow velocity of intake air flowing through the intake passage is low, the flow velocity of intake air can be raised by the choke portion in the sub-passage, such that intake air is restricted from retaining near the humidity sensor. For this reason, when the flow velocity of intake air flowing through the intake passage is slow, the responsivity of the humidity sensor can be improved. In addition, collision of a dust to the humidity sensor can be controlled by arranging the humidity sensor in the sub-passage.

According to an aspect of the present disclosure, a sensor device has a humidity sensor arranged in an intake passage through which intake air flows to an internal combustion engine. The humidity sensor outputs a signal according to a humidity of intake air flowing through the intake passage. The sensor device further has a housing with a first passage communicated with the intake passage, and a second passage branched from the first passage. A part of the intake air flows through the first passage, and the humidity sensor is arranged in the second passage. The second passage has a choke portion which decreases cross-section area of the second passage, and the humidity sensor is arranged on the choke portion.

In case where the flow velocity of intake air flowing through the intake passage is low, the flow velocity of intake air can be raised by the choke portion in the second passage, such that intake air is restricted from retaining near the humidity sensor. For this reason, when the flow velocity of intake air flowing through the intake passage is slow, the responsivity of the humidity sensor can be improved. In addition, collision of a dust to the humidity sensor can be controlled by arranging the humidity sensor in the second passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
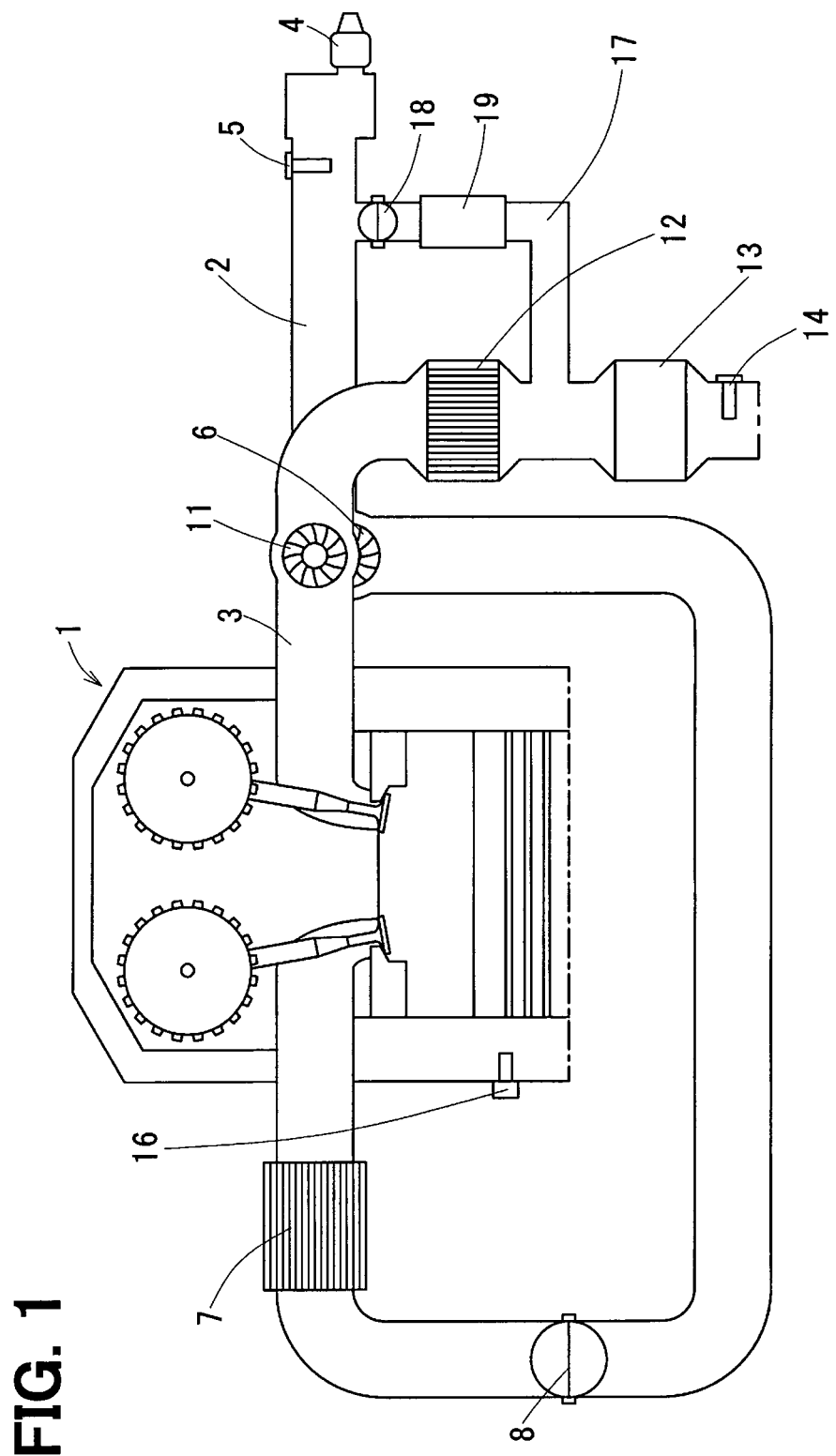
FIG. 1 is a schematic view illustrating an intake-and-exhaust system for an internal combustion engine in which a sensor device according to a first embodiment is arranged.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

An intake-and-exhaust system for an internal combustion engine 1 such as diesel engine for a vehicle is explained with reference to FIG. 1. The internal combustion engine 1 has an intake passage 2 and an exhaust passage 3. Intake air is introduced to a cylinder of the engine 1 through the intake passage 2, and gas exhausted from the cylinder of the engine 1 is emitted through the exhaust passage 3 to atmospheric air.

The intake passage 2 is defined in an intake pipe and an intake manifold, and includes internal passages of intake ports. The intake pipe is a passage component that defines the intake passage 2 from an outside air intake port to the intake manifold. An air cleaner 4, a sensor device 5, a compressor 6, an intercooler 7 and a throttle valve 8 are arranged in the intake pipe. The air cleaner 4 filters out dust and dirt contained in the intake air to be drawn by the internal combustion engine 1 so as to be removed. The sensor device 5 measures the degree of humidity in intake air. The compressor 6 is for a supercharger, and compresses intake air to have high pressure and high temperature. The intercooler 7 forcibly cools the intake air that is compressed by the compressor 6. The throttle valve 8 controls the amount of intake air drawn into the cylinder of the engine 1.

The intake manifold is a distribution tube which distributes the intake air supplied from the intake pipe to each cylinder of the internal combustion engine 1. Each cylinder has an intake port at the cylinder head of the internal combustion engine 1, and draws the intake air distributed by the intake manifold into the cylinder.

The exhaust passage 3 is defined in an exhaust pipe and an exhaust manifold, and includes internal passages of exhaust ports. Similarly to the intake port, each cylinder has an exhaust port at the cylinder head of the internal combustion engine 1, and exhaust gas is emitted from the cylinder to the exhaust manifold. The exhaust manifold is a pipe gathering the exhaust gas discharged from the exhaust ports. An exhaust turbine 11 of the supercharger is arranged at the junction between the exhaust exit of the exhaust manifold and the exhaust pipe.

The exhaust pipe is a passage component which emits the exhaust gas passing through the exhaust turbine 11 to atmosphere. A diesel particulate filter 12 (DPF), a NOx storing reduction catalyst 13, and a NOx sensor 14 are arranged in the exhaust pipe. The DPF 12 collects exhaust particulates contained in the exhaust gas. The NOx sensor 14 is placed downstream of the NOx storing reduction catalyst 13 in the flow of exhaust gas, and detects the amount of NOx at downstream of the catalyst 13.

The cylinder head having the intake port and the exhaust port includes an intake valve and an exhaust valve. The intake valve opens and closes the intake port, and the exhaust valve opens and closes the exhaust port, for each cylinder. A knock sensor 16 is disposed in the cylinder body which supports the cylinder head.

An exhaust gas recirculation (EGR) equipment is arranged in the intake-and-exhaust system of the internal combustion engine 1 shown in FIG. 1. The EGR equipment is what is called low-pressure EGR equipment which connects the inside of the exhaust passage 3 in the low-pressure range (where low exhaust pressure generates at the downstream of the DPF 12 in the flow of exhaust gas) to the inside of the intake passage 2 in the low negative pressure generating range (where low negative pressure generates at the upstream of the throttle valve 8 in the flow of intake air). The EGR equipment has the EGR passage 17 through which a part of exhaust gas is returned to the intake passage 2 as EGR gas. An EGR regulating valve 18 is arranged in the EGR passage 17, and controls the flow rate of EGR gas by adjusting the opening degree of the EGR passage 17. An EGR cooler 19 is arranged in the EGR passage 17, and cools the EGR gas to be returned to the intake passage 2.

Figure 2A:
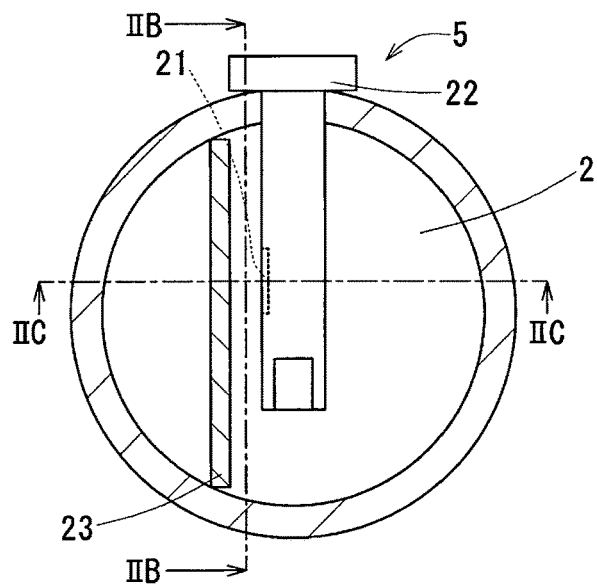
FIG. 2A is a sectional view illustrating the sensor device of the first embodiment.

The sensor device 5 is explained with reference to FIGS. 2A-2C. FIG. 2A illustrates a cross-sectional view perpendicular to the intake passage 2, FIG. 2B illustrates a cross-sectional view taken along a line IIB-IIB in FIG. 2A, and FIG. 2C illustrates a cross-sectional view taken along a line IIC-IIC in FIG. 2A.

The sensor device 5 is arranged in the intake passage 2 through which the intake air flows to the internal combustion engine 1, and has the humidity sensor 21 which generates a signal according to a humidity of the intake air flowing through the intake passage 2. The humidity sensor 21 has a known structure with a sheet shape having a humidity sensing film in which specific inductive capacity or impedance changes according to change in humidity.

The humidity sensor 21 is fixed to an external side surface of an air flow measuring device 22 able to measure the flow rate of intake air flowing through the intake passage 2. The surface of the humidity sensor 21 and the external side surface of the air flow measuring device 22 are on the same plane.

Figure 2B:
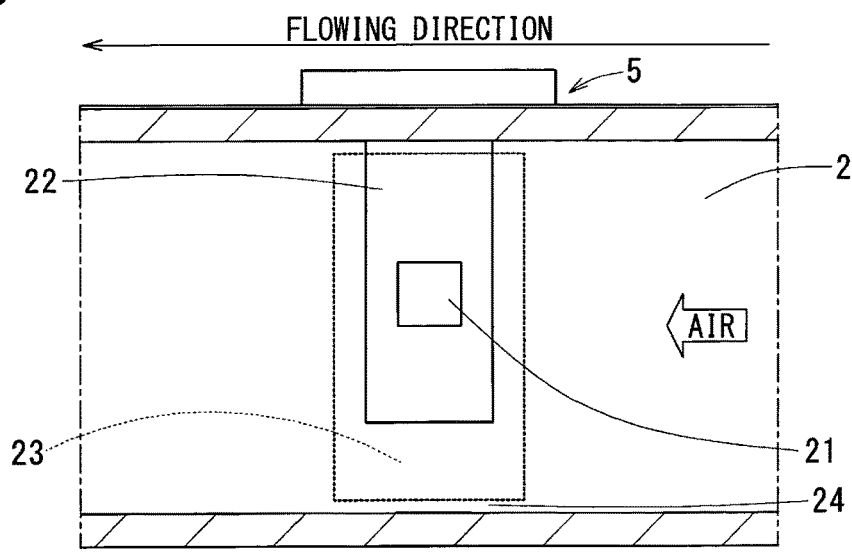
FIG. 2B is a cross-sectional view taken along a line IIB-IIB in FIG. 2A.
Figure 2C:
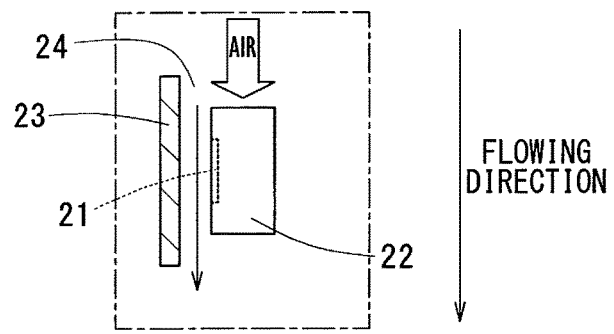
FIG. 2C is a cross-sectional view taken along a line IIC-IIC in FIG. 2A.

As shown in FIG. 2B, the air flow measuring device 22 is arranged in the intake passage 2 to extend perpendicular to the flow direction of intake air flowing through the intake passage 2. Further, the surface of the humidity sensor 21 and the external side surface of the air flow measuring device 22 are parallel to the flow direction of intake air.

The air flow measuring device 22 has common structure in which a part of intake air flowing through the intake passage 2 is taken into, and a flow rate sensor generates a signal according to the flow rate in the intake passage 2 based on the intake air.

A throttle component 23 having a board shape is arranged in the intake passage 2. The throttle component 23 is fixed to the intake passage 2 so that a first surface of the throttle component 23 opposes the external side surface of the air flow measuring device 22 and the surface of the humidity sensor 21 in parallel. That is, the choke portion 24 is defined in the intake passage 2 at the position where the throttle component 23 is placed, and the cross-section area of the intake passage 2 decreases at the choke portion 24. The humidity sensor 21 and the throttle component 23 are arranged on the choke portion 24. In other words, a clearance defined between the throttle component 23 and the air flow measuring device 22 corresponds to the choke portion 24.

The humidity sensor 21 is arranged around approximately center of the choke portion 24. The approximately center of the choke portion 24 means a portion sufficiently separated from the wall of the intake passage 2 except the air flow measuring device 22 that supports the humidity sensor 21 and the throttle component 23. The flow velocity of intake air is higher at the position corresponding to the approximately center of the choke portion 24 compared with the adjacency of the wall of the intake passage 2.

According to the first embodiment, the sensor device 5 is arranged in the intake passage 2 through which intake air flows to the internal combustion engine 1, and has the humidity sensor 21 which generates a signal according to the humidity of the intake air flowing through the intake passage 2. The intake passage 2 includes the choke portion 24 which decreases the cross-section area, and the humidity sensor 21 is arranged on the choke portion 24.

The choke portion 24 may be referred to a venturi portion, an orifice portion or a throttle portion.

Thereby, if the flow velocity of intake air flowing through the intake passage 2 is slow, the flow velocity of intake air can be raised at the choke portion 24. Thus, intake air can be restricted from retaining around the humidity sensor 21. For this reason, the responsivity of the humidity sensor 21 can be improved even when the flow velocity of intake air flowing through the intake passage 2 is slow.

The humidity sensor 21 is arranged near the approximately center of the choke portion 24, thereby raising the flow velocity of intake air on the humidity sensor 21, compared with a position near the wall of the intake passage 2 except the throttle component 23. For this reason, the responsivity of the humidity sensor 21 can be improved even when the flow velocity of intake air flowing through the intake passage 2 is slow.

(Second Embodiment)

Figure 3A:
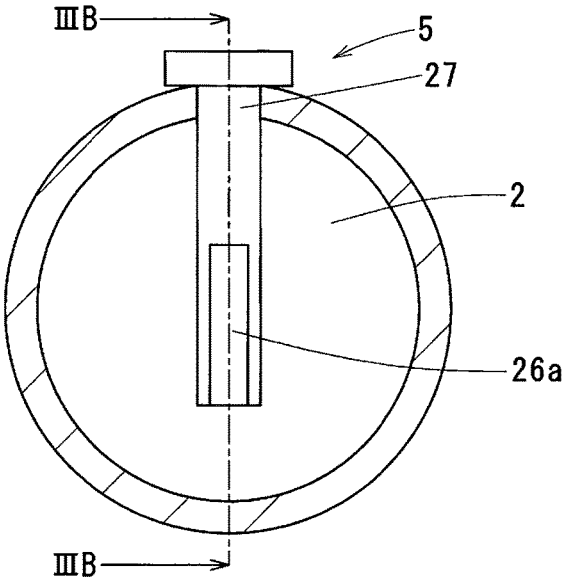
FIG. 3A is a sectional view illustrating a sensor device according to a second embodiment.
Figure 3B:
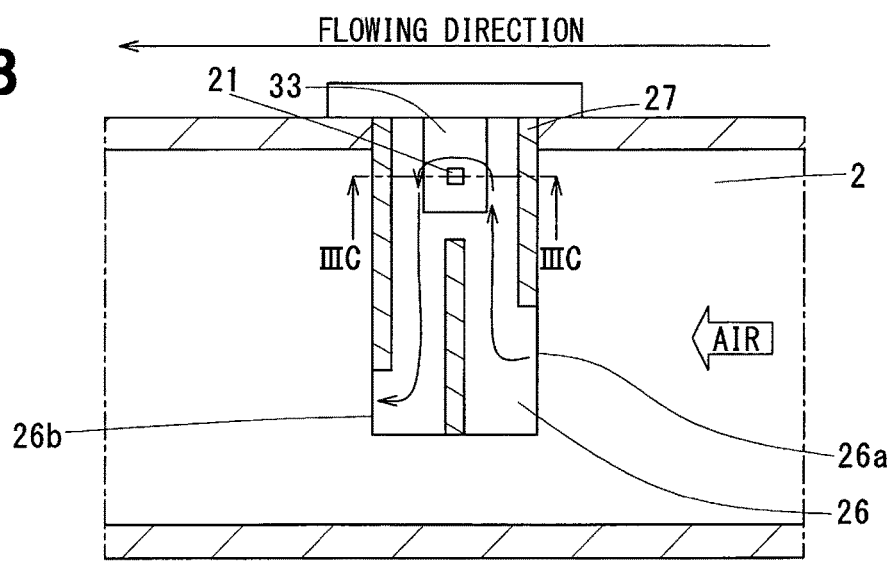
FIG. 3B is a cross-sectional view taken along a line IIIB-IIIB in FIG. 3A.
Figure 3C:
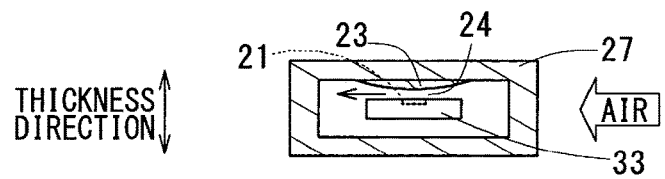
FIG. 3C is a cross-sectional view taken along a line IIIC-IIIC in FIG. 3B.

A sensor device according to a second embodiment is explained with reference to FIGS. 3A-3C. FIG. 3A illustrates a cross-sectional view perpendicular to the intake passage 2, FIG. 3B illustrates a cross-sectional view taken along a line IIIB-IIIB in FIG. 3A, and FIG. 3C illustrates a cross-sectional view taken along a line IIIC-IIIC in FIG. 3B.

The sensor device 5 includes a housing 27 having a sub-passage 26 through which a part of intake air flowing through the intake passage 2 flows. As shown in FIG. 3B, the housing 27 is arranged in the intake passage 2 to be perpendicular to the flow direction of intake air in the intake passage 2.

The sub-passage 26 is defined in the housing 27, and has an inlet 26a at the upstream end surface of the housing 27 in the flow direction of intake air in the intake passage 2. The sub-passage 26 deflects intake air at the inlet 26a by 90 degrees relative to the intake air flowing through the intake passage 2. The flow direction of intake air is further changed by 180 degrees at the U-turn part in the sub-passage 26, and the intake air flows out of the sub-passage 26 through the exit 26b at the downstream end surface of the housing 27.

The humidity sensor 21 is fixed to the first surface of the support component 33 having the board shape so that the surface of the humidity sensor 21 and the first surface of the support component 33 are on the same plane. The support component 33 is fixed to the U-turn part of the sub-passage 26 so that the thickness direction of the support component 33 intersects perpendicularly to the flow direction of intake air.

As shown in FIG. 3C, the throttle component 23 is arranged at the U-turn part of the sub-passage 26. The throttle component 23 has an approximately D-shaped cross-section, and is projected from the inner wall surface of the housing 27 perpendicularly to the flow direction of intake air. The longitudinal direction of the throttle component 23 is perpendicular to the flow direction of intake air. The throttle component 23 is arranged in the sub-passage 26 to project toward the humidity sensor 21. The projecting surface of the throttle component 23 opposes the humidity sensor 21. The throttle component 23 is fixed inside the sub-passage 26, integrally with the wall of the sub-passage 26. That is, in the sub-passage 26, the area where the throttle component 23 is placed defines the choke portion 24 in which the cross-section area decreases. The humidity sensor 21 is arranged on the choke portion 24.

The clearance between the throttle component 23 and the support component 33 decreases as approaching the humidity sensor 21, and becomes the minimum at the humidity sensor 21. That is, the humidity sensor 21 is arranged at the position where the flow velocity of intake air is the highest in the choke portion 24.

According to the second embodiment, the sensor device 5 is arranged in the intake passage 2 through which the intake air is drawn to the internal combustion engine 1, and has the humidity sensor 21 which generates a signal according to the humidity of the intake air which flows through the intake passage 2.

The sensor device 5 has the housing 27 in which the sub-passage 26 is defined to take in a part of intake air which flows through the intake passage 2, and the humidity sensor 21 is arranged in the sub-passage 26. The sub-passage 26 has the choke portion 24 which decreases the cross-section area, and the humidity sensor 21 is arranged on the choke portion 24. Moreover, the humidity sensor 21 is arranged at the position where the flow velocity of the intake air is the highest in the choke portion 24.

If the flow velocity of the intake air which flows through the intake passage 2 is slow, the flow velocity of intake air can be raised at the choke portion 24 of the sub-passage 26. The intake air is restricted from retaining around the humidity sensor 21. For this reason, when the flow velocity of the intake air which flows through the intake passage 2 is slow, the responsivity of the humidity sensor 21 can be improved.

Moreover, the responsivity of the humidity sensor 21 can be further improved by placing the humidity sensor 21 at the position where the flow velocity of the intake air is the highest in the choke portion 24.

In addition, inertia separation of dust, water drop, etc. can be carried out by arranging the humidity sensor 21 in the sub-passage 26. The characteristic change caused by corruption or collision of the dust to the humidity sensor 21 can be controlled.

(Third Embodiment)

Figure 3D:
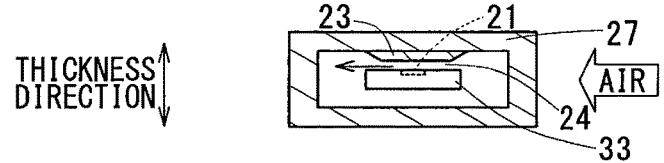
FIG. 3D is a cross-sectional view illustrating a sensor device according to a third embodiment.

In a third embodiment, the shape of the throttle component 23 is modified relative to the second embodiment. Specifically, as shown in FIG. 3D, the cross-sectional shape of the throttle component 23 is made into approximately trapezoid. In this case, the wall surface forming the choke portion 24 extends parallel to the flow direction of intake air, and opposes the humidity sensor 21 perpendicularly to the flow direction of intake air. Therefore, disturbance (disorder) can be restricted from generated in the flow of the intake air around the humidity sensor 21.

(Fourth Embodiment)

Figure 4A:
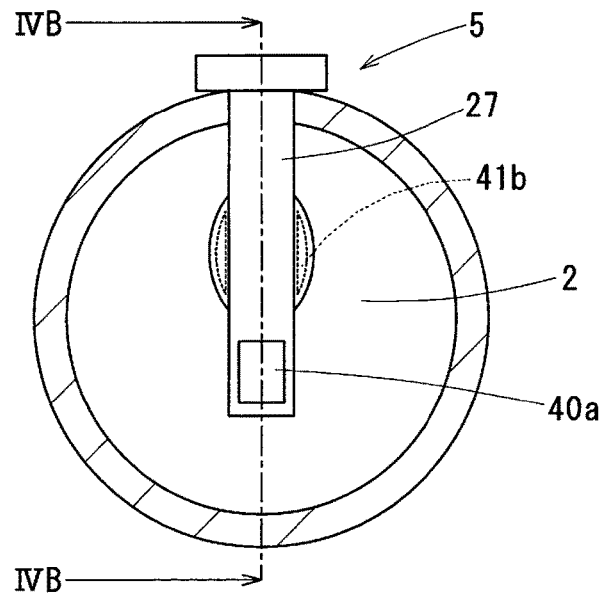
FIG. 4A is a sectional view illustrating a sensor device according to a fourth embodiment.
Figure 4B:
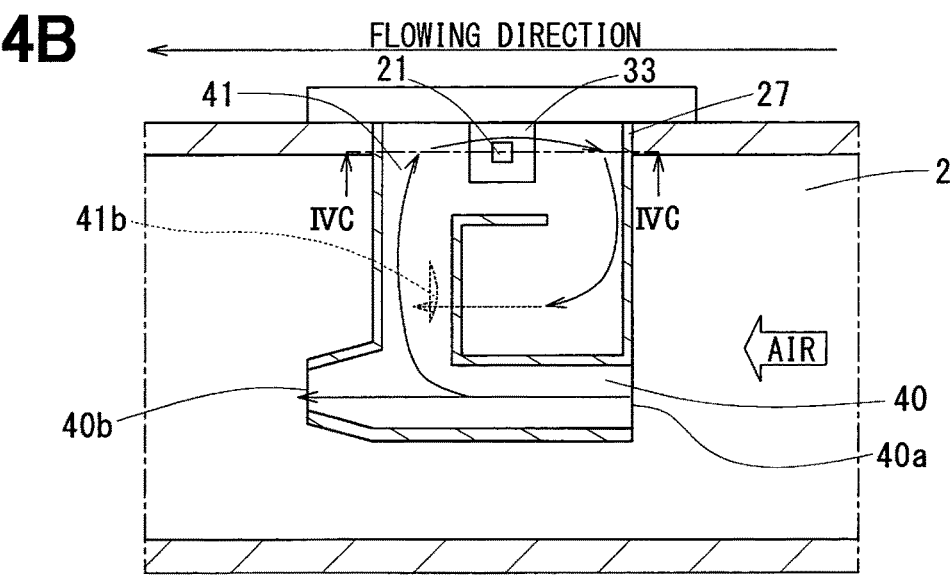
FIG. 4B is a cross-sectional view taken along a line IVB-IVB in FIG. 4A.
Figure 4C:
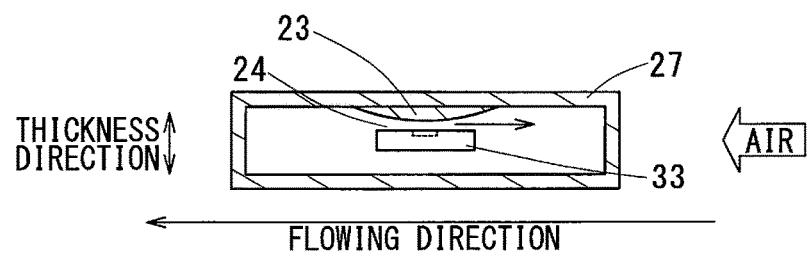
FIG. 4C is a cross-sectional view taken along a line IVC-IVC in FIG. 4B.

The sensor device 5 according to a fourth embodiment is explained with reference to FIGS. 4A-4C. FIG. 4A illustrates a cross-sectional view perpendicular to the intake passage 2, FIG. 4B illustrates a cross-sectional view taken along a line IVB-IVB in FIG. 4A, and FIG. 4C illustrates a cross-sectional view taken along a line IVC-IVC in FIG. 4B.

The sensor device 5 includes the housing 27 having the sub-passage 40 which takes in a part of intake air flowing through the intake passage 2, and a branch passage 41 branched from the sub-passage 40. The sub-passage 40 corresponds to a first passage, and the branch passage 41 corresponds to a second passage. As shown in FIG. 4B, the housing 27 is arranged in the intake passage 2 to intersect perpendicularly to the flow direction of intake air in the intake passage 2.

The sub-passage 40 is formed to extend approximately parallel to the flow direction of intake air in the intake passage 2. Specifically, the sub-passage 40 has an inlet 40a and an exit 40b. The inlet 40a is defined at the upstream end surface of the housing 27 in the flow direction of intake air in the intake passage 2. The exit 40b is defined at the downstream end surface of the housing 27 in the flow direction of intake air in the intake passage 2. That is, the sub-passage 40 passes through the housing 27 in the flow direction of intake air in the intake passage 2 from the inlet 40a to the exit 40b.

The branch passage 41 has an inlet passage, a U-turn part and an exit passage. The inlet passage is branched from the sub-passage 40 to define the angle of 90 degrees between the inlet passage and the sub-passage 40. The flow direction of intake air changes by 180 degrees in the U-turn part. The exit passage is communicated to an exit 41b provided at the both side surface of the housing 27. Therefore, a part of intake air flowing through the sub-passage 40 flows into the branch passage 41 from the inlet passage, U-turns in the U-turn part, and flows out of the exit passage of the branch passage 41 through the exit 41b.

The humidity sensor 21 is fixed to the first surface of the support component 33 having the board shape so that the surface of the humidity sensor 21 and the first surface of the support component 33 are on the same plane. The support component 33 is fixed to the U-turn part of the branch passage 41 so that the thickness direction of the support component 33 intersects perpendicularly to the flow direction of intake air.

As shown in FIG. 4C, the throttle component 23 is arranged to the U-turn part of the branch passage 41. The throttle component 23 has an approximately D-shaped cross-section, and extends perpendicular to the flow direction of intake air. The longitudinal direction of the throttle component 23 crosses the flow direction of intake air. The throttle component 23 is arranged in the branch passage 41 to project toward the humidity sensor 21. The projecting surface of the throttle component 23 opposes the humidity sensor 21. The throttle component 23 is fixed inside the branch passage 41, integrally with the wall of the branch passage 41. That is, in the branch passage 41, the area where the throttle component 23 is placed defines the choke portion 24 in which the cross-section area decreases. The humidity sensor 21 is arranged on the choke portion 24.

According to the fourth embodiment, the sensor device 5 is arranged in the intake passage 2 through which the intake air flows to the internal combustion engine 1, and has the humidity sensor 21 which generates a signal according to the humidity of the intake air flowing through the intake passage 2. The sensor device 5 includes the housing 27 having the sub-passage 40 which takes in a part of intake air flowing through the intake passage 2, and the branch passage 41 branched from the sub-passage 40. The humidity sensor 21 is arranged in the branch passage 41. The branch passage 41 has the choke portion 24 which decreases the cross-section area, and the humidity sensor 21 is arranged on the choke portion 24.

Thereby, if the flow velocity of the intake air flowing through the intake passage 2 is slow, the flow velocity of intake air can be raised in the choke portion 24 of the branch passage 41. The intake air can be restricted from retaining around the humidity sensor 21. For this reason, when the flow velocity of the intake air flowing through the intake passage 2 is slow, the responsivity of the humidity sensor 21 can be improved. In addition, by arranging the humidity sensor 21 in the branch passage 41, inertia separation of dust, water drop, etc. can be carried out, and the characteristic change caused by corruption or collision of the dust to the humidity sensor 21 can be controlled.

(Fifth Embodiment)

Figure 5A:
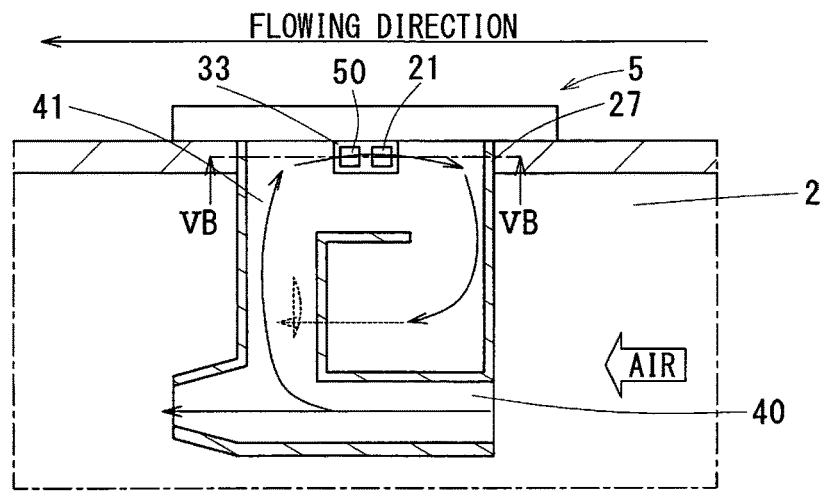
FIG. 5A is a sectional view illustrating a sensor device according to a fifth embodiment.
Figure 5B:
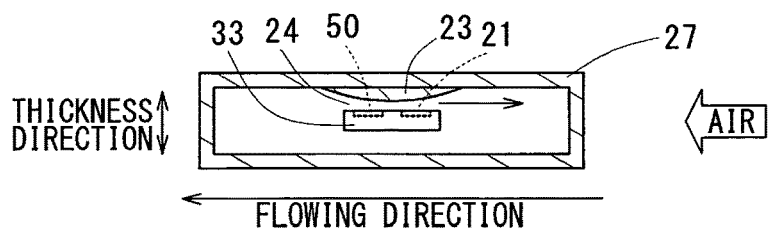
FIG. 5B is a cross-sectional view taken along a line VB-VB in FIG. 5A.

A fifth embodiment is explained with reference to FIGS. 5A and 5B. FIG. 5A illustrates a transverse cross-sectional view corresponding to, for example, FIG. 2B, 3B or 4B. FIG. 5B illustrates a cross-sectional view taken along a line VB-VB in FIG. 5A. Similarly to the fourth embodiment, the sensor device 5 includes the housing 27 having the sub-passage 40 and the branch passage 41, and the support component 33 is arranged at the U-turn part in the housing 27.

The sensor device 5 includes a flow rate sensor 50 which generates a signal according to the flow rate of intake air as a parameter other than the humidity of intake air. The flow rate sensor 50 has a common structure in which a membrane is arranged on a semiconductor board, and a heat emitting element and a temperature sensing element are formed on the membrane with a thin film resistor.

The humidity sensor 21 and the flow rate sensor 50 are fixed to the first surface of the support component 33 having the board shape, and located adjacent to each other, so that the surface of the humidity sensor 21 and the surface of the flow rate sensor 50 are on the same plane as the first surface of the support component 33.

The support component 33 is fixed to the U-turn part of the branch passage 41 so that the thickness direction of the support component 33 intersects perpendicularly to the flow direction of intake air and that the humidity sensor 21 and the flow rate sensor 50 are arranged in the flow direction of intake air.

The flow rate sensor 50 is located the most upstream side in the flow direction of intake air. That is, the flow rate sensor 50 and the humidity sensor 21 are arranged in this order on the support component 33 in the flow direction of intake air.

As shown in FIG. 5B, the throttle component 23 is disposed at the U-turn part of the branch passage 41. The throttle component 23 has an approximately D-shaped cross-section, and extends perpendicular to the flow direction of intake air. The longitudinal direction of the throttle component 23 crosses the flow direction of intake air. The throttle component 23 is arranged in the branch passage 41 to project toward the humidity sensor 21 and the flow rate sensor 50. The projecting surface of the throttle component 23 opposes the humidity sensor 21 and the flow rate sensor 50. The throttle component 23 is fixed inside the branch passage 41, integrally with the wall of the branch passage 41.

That is, in the branch passage 41, the area where the throttle component 23 is placed defines the choke portion 24 in which the cross-section area decreases. The support component 33 which supports the humidity sensor 21 and the flow rate sensor 50 is arranged on the choke portion 24 such that the thickness direction of the support component 33 intersects perpendicularly to the flow direction of intake air in the choke portion 24.

The humidity sensor 21 and the flow rate sensor 50 are arranged on the first surface of the support component 33, and are arranged in the flow direction of intake air in the choke portion 24. The flow rate sensor 50 is arranged at the most upstream side in the flow direction of intake air in the choke portion 24. In other words, a sensor located at the most upstream is the flow rate sensor 50 in case where plural sensors are arranged on the first surface of the support component 33.

According to the fifth embodiment, the sensor device 5 includes the flow rate sensor 50 and the support component 33. The flow rate sensor 50 corresponds to a secondary sensor which generates a signal according to a parameter of intake air other than the humidity as a quantity of state. The support component 33 supports the humidity sensor 21 and the flow rate sensor 50. The support component 33 has the board shape, and is disposed in the choke portion 24. The thickness direction of the support component 33 is perpendicular to the flow direction of intake air in the choke portion 24. The humidity sensor 21 and the flow rate sensor 50 are disposed on the first surface of the support component 33, and are arranged in the flow direction of intake air in the choke portion 24.

The projecting amount of the support component 33 projecting into the branch passage 41 can be restricted by arranging the humidity sensor 21 and the flow rate sensor 50 side by side in the flow direction of intake air. For this reason, disorder in the flow of intake air can be suppressed while the support component 33 is located in the branch passage 41.

The flow rate sensor 50 is located at the most upstream in the flow direction of intake air in the choke portion 24. Since the humidity sensor 21 is not placed upstream of the flow rate sensor 50 in the flow direction of intake air in the choke portion 24, the flow rate sensor 50 is not affected by disorder in the flow that is caused by minute unevenness or level difference on the surface of the humidity sensor 21. For this reason, the flow rate sensor 50 can stably measure the flow rate of intake air.

(Sixth Embodiment)

Figure 5C:
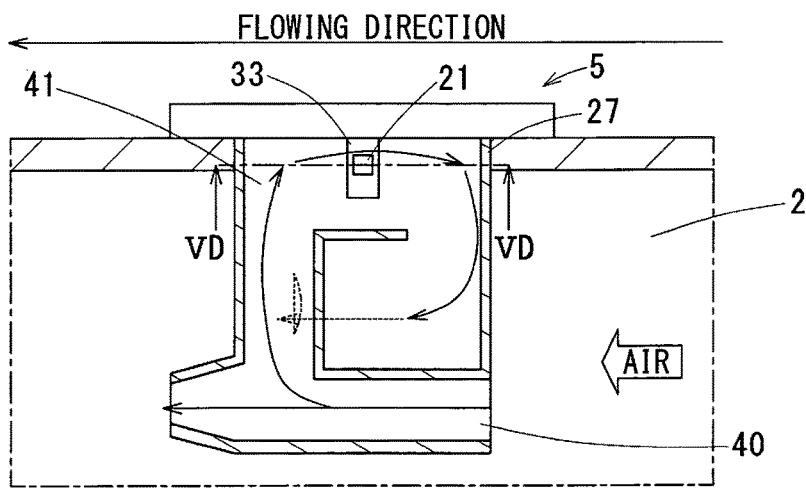
FIG. 5C is a sectional view illustrating a sensor device according to a sixth embodiment.
Figure 5D:
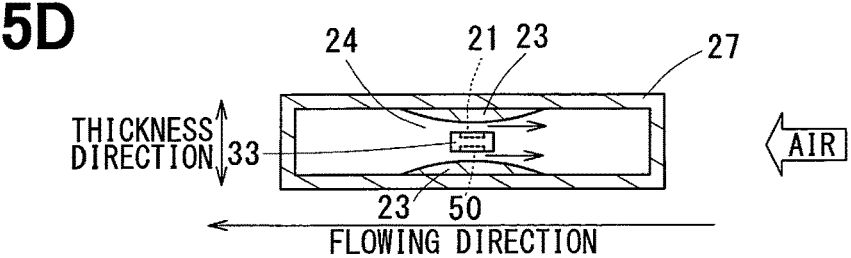
FIG. 5D is a cross-sectional view taken along a line VD-VD in FIG. 5C.

The sensor device 5 according to the sixth embodiment is explained with reference to FIGS. 5C and 5D. FIG. 5C illustrates a transverse cross-sectional view corresponding to, for example, FIG. 2B, 3B or 4B. FIG. 5D illustrates a cross-sectional view taken along a line VD-VD in FIG. 5C. Similarly to the fourth embodiment, the sensor device 5 includes the housing 27 having the sub-passage 40 and the branch passage 41, and the support component 33 is arranged at the U-turn part in the housing 27.

The sensor device 5 includes the flow rate sensor 50 which generates a signal according to a flow rate of intake air as a parameter other than the humidity, similarly to the fifth embodiment. The humidity sensor 21 is fixed to the first surface of the support component 33 having the board shape so that the surface of the humidity sensor 21 and the first surface of the support component 33 are on the same plane. The flow rate sensor 50 is fixed to a second surface of the support component 33 opposite form the first surface so that the surface of the flow rate sensor 50 and the second surface of the support component 33 are on the same plane. The humidity sensor 21 and the flow rate sensor 50 are fixed to at least partially overlap with each other in the thickness direction of the support component 33. The support component 33 is fixed to the U-turn part of the branch passage 41 so that the thickness direction of the support component 33 intersects perpendicularly to the flow direction of intake air.

As shown in FIG. 5D, two of the throttle components 23 are disposed to the U-turn part of the branch passage 41. Each of the throttle components 23 has an approximately D-shaped cross-section, and extends perpendicular to the flow direction of intake air. The longitudinal direction of the throttle component 23 crosses the flow direction of intake air. One of the throttle components 23 is arranged in the branch passage 41 to project toward the humidity sensor 21 and the projecting surface of the throttle component 23 opposes the humidity sensor 21. The other of the throttle components 23 is arranged in the branch passage 41 to project toward the flow rate sensor 50 and the projecting surface of the throttle component 23 opposes the flow rate sensor 50. Each of the throttle components 23 is fixed inside the branch passage 41, integrally with the wall of the branch passage 41.

That is, in the branch passage 41, the throttle component 23 is arranged to define the choke portion 24 in which the cross-section area decreases. The support component 33 supporting the humidity sensor 21 and the flow rate sensor 50 is arranged on the choke portion 24 such that the thickness direction of the support component 33 intersects perpendicularly to the flow direction of intake air in the choke portion 24.

The humidity sensor 21 is disposed on the first surface of the support component 33, and the flow rate sensor 50 is disposed on the second surface of the support component 33. The humidity sensor 21 and the flow rate sensor 50 overlap with each other in the thickness direction of the support component 33.

According to the sixth embodiment, the sensor device 5 includes the flow rate sensor 50 as a secondary sensor which generates a signal according to quantity of state other than the humidity of intake air, and the support component 33 which supports the humidity sensor 21 and the flow rate sensor 50.

The support component 33 has the board shape, and is disposed to the choke portion 24. The thickness direction of the support component 33 is perpendicular to the flow direction of intake air in the choke portion 24. The humidity sensor 21 is formed on the first surface of the support component 33, and the flow rate sensor 50 is formed on the second surface of the support component 33. At least a part of the humidity sensor 21 overlaps with the flow rate sensor 50 in the thickness direction of the support component 33.

Thereby, the size of the support component 33 can be made small in the flow direction of intake air. For this reason, the size of the sensor device 5 can be made small. In addition, since the humidity sensor 21 and the flow rate sensor 50 are arranged on the surfaces different and opposite from each other, the shape of the throttle component 23 can be optimized individually.

The humidity sensor 21 and the flow rate sensor 50 are arranged near the approximately center of the choke portion 24, thereby raising the flow velocity of intake air compared with the adjacency of the wall of the branch passage 41 except the throttle component 23. For this reason, when the flow velocity of the intake air which flows through the intake passage 2 is slow, the responsivity of the humidity sensor 21 and the flow rate sensor 50 can be improved more.

The clearance between the throttle component 23 and the support component 33 decreases as the throttle component 23 approaches the humidity sensor 21, and the clearance becomes the minimum at the place opposing the humidity sensor 21.

The clearance between the throttle component 23 and the support component 33 decreases as the throttle component 23 approaches the flow rate sensor 50, and the clearance becomes the minimum at the place opposing the flow rate sensor 50.

That is, the humidity sensor 21 and the flow rate sensor 50 are arranged at the position where the flow velocity of the intake air is the highest in the choke portion 24. For this reason, the responsivity of the humidity sensor 21 and the flow rate sensor 50 can be improved further.

(Modifications)

Figure 6A:
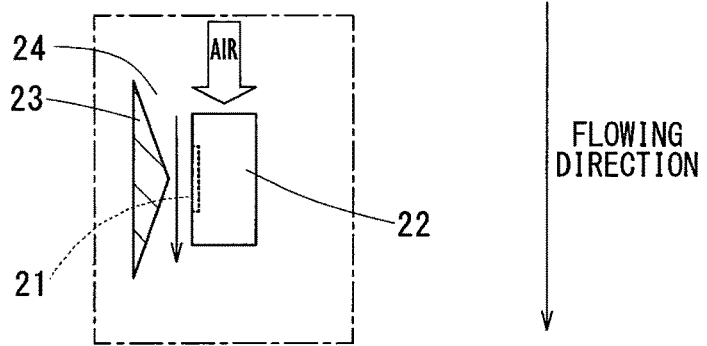
FIG. 6A, FIG. 6B and FIG. 6C are schematic views illustrating modifications in the sensor devices.
Figure 6B:
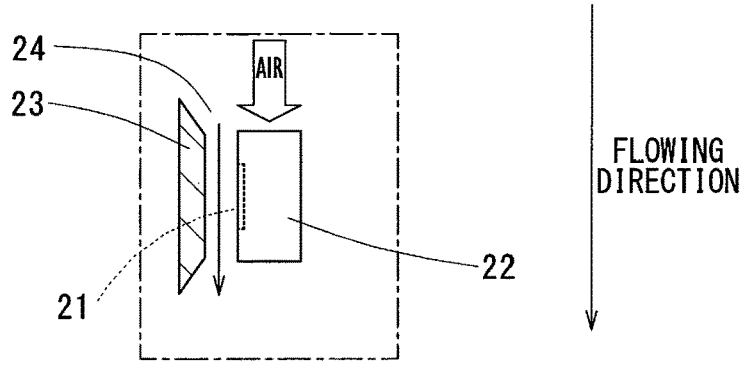
Figure 6C:
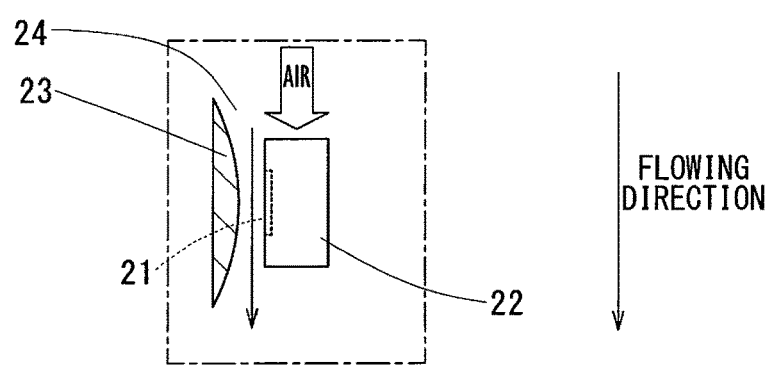

In the first embodiment, the cross-sectional shape of the throttle component 23 taken along the line IIC-IIC presents the rectangle, but is not limited to the rectangle. The throttle component 23 may have other shape which can decrease the cross-section area. For example, as shown in FIG. 6A, the cross-sectional shape of the throttle component 23 may present a triangle. Further, as shown in FIG. 6B, the cross-sectional shape of the throttle component 23 may present a trapezoid. As shown in FIG. 6C, the cross-sectional shape of the throttle component 23 may present an approximately D-shape.

Figure 7A:
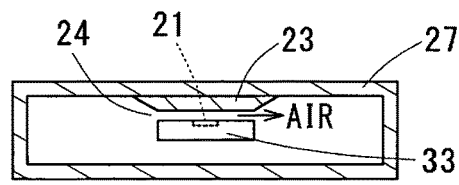
FIG. 7A, FIG. 7B, FIG. 7C, FIG. 7D, FIG. 7E, FIG. 7F and FIG. 7G are schematic views illustrating modifications in the sensor devices.
Figure 7B:
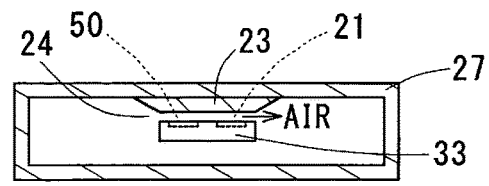
Figure 7C:
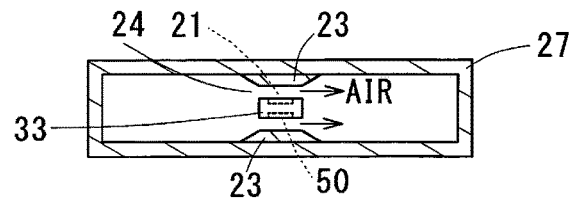
Figure 7D:
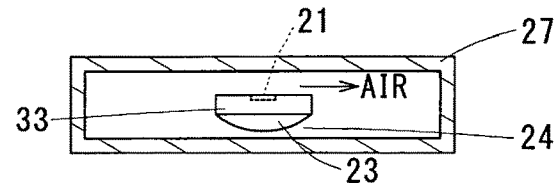

In the fourth to sixth embodiments, the throttle component 23 has the approximately D-shape cross-section. However, as shown in FIGS. 7A-7C, the throttle component 23 may have a trapezoid cross-section. The throttle component 23 may have other shape that decreases the cross-section area, and may be located adjacent to the support component 33. For example, as shown in FIG. 7D, the throttle component 23 having the approximately D-shape cross-section may be arranged on the surface of the support component 33 not having the humidity sensor 21.

Figure 7E:
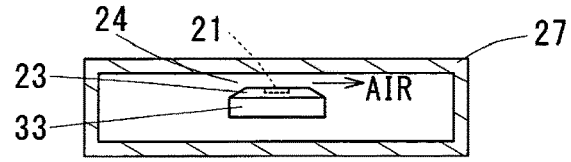

Moreover, as shown in FIG. 7E, the throttle component 23 having the approximately trapezoid cross-section may be formed on the support component 33, and the humidity sensor 21 may be formed in the throttle component 23.

In case where the throttle component 23 is formed on the support component 33, the throttle component 23 constitutes a part of the support component 33 as a throttle part projected from the support component 33 in a direction perpendicular to a flow direction of the intake air.

Figure 7F:
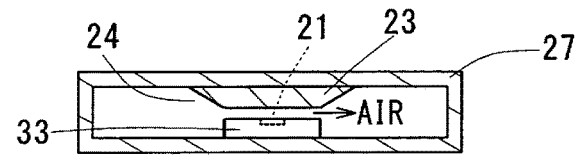
Figure 7G:
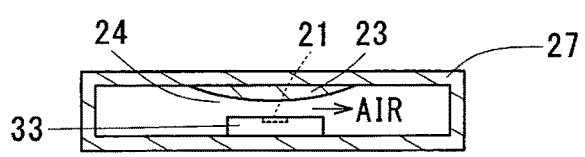

In the second to fifth embodiments, the support component 33 is not in contact with the wall forming each passage. However, as shown in FIGS. 7F and 7G, the support component 33 may be in contact with the wall forming each passage. In these cases, the size of the sensor device 5 can be made small in the thickness direction of the support component 33.

Moreover, in the second to sixth embodiment, the cross-sectional shape of the support component 33 is an approximately rectangle. However, the support component 33 may have a spindle-shaped cross-section.

Moreover, in the fifth and sixth embodiments, the flow rate sensor 50 is an example of a secondary sensor, but the secondary sensor is not limited to the flow rate sensor 50. For example, the secondary sensor may be a temperature sensor or a pressure sensor. Furthermore, the number of the secondary sensors is not limited to one, so plural secondary sensors may be arranged on the support component 33.

The humidity sensor 21 may be shaped to project toward the wall surface of the choke portion 24 in a direction perpendicular to a flow direction of the intake air.

Such changes and modifications are to be understood as being within the scope of the present disclosure as defined by the appended claims.

What is claimed is:

1. A sensor device that is disposed in an intake passage through which intake air flows to an internal combustion engine, the sensor device comprising:
a humidity sensor that generates a signal according to a humidity of the intake air flowing through the intake passage, wherein a choke portion is defined in the intake passage to decrease a cross-sectional area of the intake passage, and
the humidity sensor is arranged on the choke portion;
a flow rate sensor that generates a signal according to a flow rate of intake air; and
a support component that supports the humidity sensor and the flow rate sensor,
wherein
the support component has a board shape and is arranged in the choke portion, and a thickness direction of the support component is perpendicular to a flow direction of the intake air in the choke portion,
the support component has a first surface and a second surface opposite from each other in the thickness direction of the support component, and
the humidity sensor is disposed on the first surface of the support component, and the flow rate sensor is disposed on the second surface of the support component.

2. The sensor device according to claim 1, wherein the humidity sensor is located at a center part of the choke portion.

3. The sensor device according to claim 1, wherein the humidity sensor is located at a position where a flow speed of the intake air is the highest in the choke portion.

4. The sensor device according to claim 1, wherein at least one of the humidity sensor and the flow rate sensor is located at a center part of the choke portion.

5. The sensor device according to claim 1 wherein at least one of the humidity sensor and the flow rate sensor is located at a position where a flow speed of the intake air is the highest in the choke portion.

6. The sensor device according to claim 1, wherein the humidity sensor and the flow rate sensor are at least partially overlapped with each other in the thickness direction of the support component.

7. The sensor device according to claim 1, wherein a wall surface of the choke portion is shaped to project toward the humidity sensor in a direction perpendicular to a flow direction of the intake air.

8. The sensor device according to claim 1, wherein the support component has a throttle part projected from the support component in a direction perpendicular to a flow direction of the intake air, and the humidity sensor is formed in the throttle part.

9. The sensor device according to claim 1, further comprising:
a throttle component that forms the choke portion, wherein the throttle component is located on the support component.

10. A sensor device that is disposed in an intake passage through which intake air flows to an internal combustion engine, the sensor device comprising:
a humidity sensor that generates a signal according to a humidity of the intake air flowing through the intake passage;
a flow rate sensor that generates a signal according to a flow rate of intake air; and
a support component that supports the humidity sensor and the flow rate sensor, wherein
the support component has a board shape,
the support component has a first surface and a second surface opposite from each other in a thickness direction of the support component,
the humidity sensor is disposed on the first surface of the support component, and
the flow rate sensor is disposed on the second surface of the support component.

11. The sensor device according to claim 10, wherein
the support component is disposed in the intake passage to define a choke passage decreasing a cross-sectional area of the intake passage.

12. The sensor device according to claim 10, further comprising:
a housing that houses the support component, wherein
the humidity sensor is disposed in a passage defined between the first surface of the support component and the housing, and
the flow rate sensor is disposed in a passage defined between the second surface of the support component and the housing.

13. The sensor device according to claim 10, wherein
the flow rate sensor is located upstream of the humidity sensor in a flow direction of the intake air.

14. A sensor device that is disposed in an intake passage through which intake air flows to an internal combustion engine, the sensor device comprising:
a humidity sensor that generates a signal according to a humidity of the intake air flowing through the intake passage;
a flow rate sensor that generates a signal according to a flow rate of intake air;
a support component that supports the humidity sensor and the flow rate sensor; and
a housing having
a first passage communicated with the intake passage, a part of the intake air flowing through the first passage, and
a second passage branched from the first passage, wherein
the humidity sensor is arranged in the second passage,
a choke portion is defined in the second passage to decrease a cross-sectional area of the second passage,
the humidity sensor is arranged on the choke portion,
the support component has a board shape and is arranged in the choke portion, and a thickness direction of the support component is perpendicular to a flow direction of the intake air in the choke portion,
the support component has a first surface and a second surface opposite from each other in the thickness direction of the support component, and
the humidity sensor is disposed on the first surface of the support component, and the flow rate sensor is disposed on the second surface of the support component.

15. The sensor device according to claim 14, further comprising:
a throttle component that forms the choke portion, wherein the throttle component is located on a wall surface of the housing opposing the humidity sensor.

16. A sensor device that is disposed in an intake passage through which intake air flows to an internal combustion engine, the sensor device comprising:
a humidity sensor that generates a signal according to a humidity of the intake air flowing through the intake passage;
a flow rate sensor that generates a signal according to a flow rate of intake air;
a support component that supports the humidity sensor and the flow rate sensor; and
a housing having a sub-passage communicated with the intake passage, a part of the intake air flowing through the sub-passage, wherein
the humidity sensor is arranged in the sub-passage,
a choke portion is defined in the sub-passage to decrease a cross-sectional area of the sub-passage,
the humidity sensor is arranged on the choke portion;
the support component has a board shape and is arranged in the choke portion, and a thickness direction of the support component is perpendicular to a flow direction of the intake air in the choke portion,
the support component has a first surface and a second surface opposite from each other in the thickness direction of the support component, and
the humidity sensor is disposed on the first surface of the support component, and the flow rate sensor is disposed on the second surface of the support component.

* * * * *